US008103968B2

(12) United States Patent  (10) Patent No.: US 8,103,968 B2
Cheng  (45) Date of Patent: Jan. 24, 2012

(54) APPARATUS, METHOD, AND SYSTEM FOR REPRESENTING A MULTIMEDIA DISPLAY

(75) Inventor: Chih-Hung Cheng, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 468 days.

(21) Appl. No.: 11/382,784

(22) Filed: May 11, 2006

(65) Prior Publication Data

US 2007/0266340 A1  Nov. 15, 2007

(51) Int. Cl.
*G06F 3/048* (2006.01)
*G06F 13/00* (2006.01)

(52) U.S. Cl. ........ 715/825; 715/767; 715/817; 715/821; 725/40

(58) Field of Classification Search .......... 715/720, 715/765, 767, 782, 811, 821, 835–836, 838, 715/841, 847, 850, 852, 866, 817, 825; 725/46–47, 725/52, 40
See application file for complete search history.

(56) References Cited

U.S. PATENT DOCUMENTS

| | | | |
|---|---|---|---|
| 5,220,675 A | 6/1993 | Padawer et al. | |
| 5,420,975 A * | 5/1995 | Blades et al. | 715/811 |
| 5,678,015 A | 10/1997 | Goh | |
| 5,898,435 A | 4/1999 | Nagahara et al. | |
| 5,978,043 A | 11/1999 | Blonstein et al. | |
| 6,043,818 A | 3/2000 | Nakano et al. | |
| 6,621,509 B1 | 9/2003 | Eiref et al. | |
| 6,636,246 B1 | 10/2003 | Gallo et al. | |
| 6,690,391 B1 * | 2/2004 | Proehl et al. | 715/720 |
| 6,806,893 B1 | 10/2004 | Kolawa et al. | |
| 6,928,621 B2 | 8/2005 | Conrad et al. | |
| 6,938,218 B1 | 8/2005 | Rosen | |
| 7,055,104 B1 * | 5/2006 | Billmaier et al. | 715/765 |
| 7,178,111 B2 * | 2/2007 | Glein et al. | 715/848 |
| 2006/0164389 A1 | 7/2006 | Ringot | |

* cited by examiner

*Primary Examiner* — William Bashore
*Assistant Examiner* — Andrew Tank
(74) *Attorney, Agent, or Firm* — Patterson Thuente Christensen Pedersen, P.A.

(57) ABSTRACT

A system, an apparatus, and a method for representing a multimedia display are proposed in the present invention for displaying multimedia data and a menu. The system comprises an interface from which the user may input signals and the apparatus comprising screens for displaying. Three signals can be inputted from the interface, a first signal, a second signal, and a third signal. The apparatus comprises a first screen for displaying multimedia data, a second screen for displaying menu, and optionally a third screen for displaying information related to the multimedia data. The method comprises the steps of: providing a first screen to display multimedia data; providing a second screen to display a menu; and optionally providing a third screen to display information related to multimedia data.

66 Claims, 7 Drawing Sheets

APPARATUS, METHOD, AND SYSTEM FOR REPRESENTING A MULTIMEDIA DISPLAY

CROSS-REFERENCES TO RELATED APPLICATIONS

Not applicable.

BACKGROUND OF THE INVENTION

1. Field of the Invention

The present invention relates to apparatuses, methods, and systems for representing a multimedia display. More particularly, the present invention relates to apparatuses, methods, and systems for displaying a multimedia display which displays multimedia data, a menu, and optionally information related to the multimedia data.

2. Descriptions of the Related Art

Due to the rapid development of technology, multimedia data can be displayed on a variety of products, such as computers and televisions. Using a keyboard and a mouse to control display of multimedia data on a computer is not new for users nowadays. On the contrary, using devices such as a remote controller to control display of multimedia data on, for example, a television is still novel to many users. Consequently, many researches and developments have been conducted for providing convenient equipments and graphical user interfaces (GUIs) for users to control multimedia data.

One of the researches and developments is to display information of multimedia data in a better organization. For example, in U.S. Pat. No. 6,621,509, information thumbnails are presented on a display area and details of multimedia data are retrieved based on the selected thumbnail. Moreover, a selected 3D object will be displayed in a foreground according to user selections. In U.S. Pat. No. 5,678,015, a user may select a number of workspaces to be displayed at the same time. Each selected workspace is then mapped to a polygonal surface in texture, and the polyhedron rotates under user's control. The two patents simply disclose the solutions to show the information of multimedia data, but do not introduce a friendly operation to control multimedia data.

In U.S. Pat. No. 6,636,246, a 3D spatial user interface is provided, on which content of portals is displayed within each rectangular spaces. Upon selecting an item of multimedia data, the application of the portals is invoked. Although it allows a user to intuitively locate and access resources from a computing device, the patent fails to provide a view of a plurality of multimedia data. Besides, it does not provide a particular structure to organize the multimedia data.

In U.S. Pat. No. 5,898,435, an image display apparatus is provided. The image display apparatus displays multimedia data in a way of a cylinder. However, it only provides one-dimension display.

As a result, the GUI solutions of the prior art are still not friendly to users. How to display information of multimedia data and how to easily control the multimedia data remains an issue in the industrial field.

SUMMARY OF THE INVENTION

An object of this invention is to provide an apparatus for representing a multimedia display. The multimedia display displays multimedia data and a menu. The apparatus comprises a first screen and a second screen. The first screen is controlled by one of a first signal and a second signal and is configured to display the multimedia data. The first signal triggers a first function and the second signal triggers a second function. The second screen is controlled by a third signal and is configured to display the menu. The third signal triggers a third function.

Another object of this invention is to provide an apparatus for representing a multimedia display. The multimedia display displays multimedia data, a menu, and information related to the multimedia data. The apparatus comprises a first screen, a second screen, and a third screen. The first screen is controlled by one of a first signal and a second signal, and is configured to display the multimedia data. The first signal triggers a first function and the second signal triggers a second function. The second screen is controlled by a third signal and is configured to display the menu. The third signal triggers a third function. The third screen is configured to display the information.

Another object of this invention is to provide a method for representing a multimedia display. The multimedia display displays multimedia data and a menu. The method comprises the steps of providing a first screen to display the multimedia data and providing a second screen to display the menu. The first screen is controlled by one of a first signal and a second signal. The first signal triggers a first function and the second signal triggers a second function. The second screen is controlled by a third signal which triggers a third function.

Another object of this invention is to provide a method for representing a multimedia display. The multimedia display displays multimedia data, a menu, and information related to the multimedia data. The method comprises the steps of providing a first screen to display the multimedia data; providing a second screen to display the menu; and providing a third screen to display the information. The first screen is controlled by one of a first signal and a second signal. The first signal triggers a first function and the second signal triggers a second function. The second screen is controlled by a third signal which triggers a third function.

A further object of this invention is to provide a system for representing a multimedia display. The multimedia display displays multimedia data and a menu. The system comprises an interface and a screen. The interface is configured for inputting a first signal, a second signal and a third signal. The screen comprises a first screen and a second screen. The first screen is controlled by one of the first signal and the second signal, and is configured to display the multimedia data. The first signal triggers a first function and the second signal triggers a second function. The second screen is controlled by the third signal and is configured to display the menu. The third signal triggers a third function.

A further object of this invention is to provide a system for representing a multimedia display. The multimedia display displays multimedia data, a menu, and information related to the multimedia data. The system comprises an interface and a screen. The interface is configured for inputting a first signal, a second signal, and a third signal. The screen comprises a first screen, a second screen, and a third screen. The first screen is controlled by one of the first signal and the second signal and is configured to display the multimedia data. The first signal triggers a first function and the second signal triggers a second function. The second screen is controlled by the third signal and is configured to display the menu. The third signal triggers a third function. The third screen is configured to display the information.

Yet a further object of this invention is to provide an apparatus for representing a multimedia display. The multimedia display displays multimedia data and a menu. The apparatus comprises means for displaying the multimedia data and means for displaying the menu. The means for displaying the multimedia data is controlled by one of a first signal and a second signal. The first signal triggers a first function and the second signal triggers a second function. The means for displaying the menu is controlled by a third signal. The third signal triggers a third function.

Yet a further object of this invention is to provide an apparatus for representing a multimedia display. The multimedia display displays multimedia data, a menu, and information related to the multimedia data. The apparatus comprises means for displaying the multimedia data; means for displaying the menu; and means for displaying the information. The means for displaying the multimedia data is controlled by one of a first signal and a second signal. The first signal triggers a first function and the second signal triggers a second function. The means for displaying the menu is controlled by a third signal. The third signal triggers a third function.

The present invention has advantages of friendly displaying information of multimedia data and easily controlling the multimedia data.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
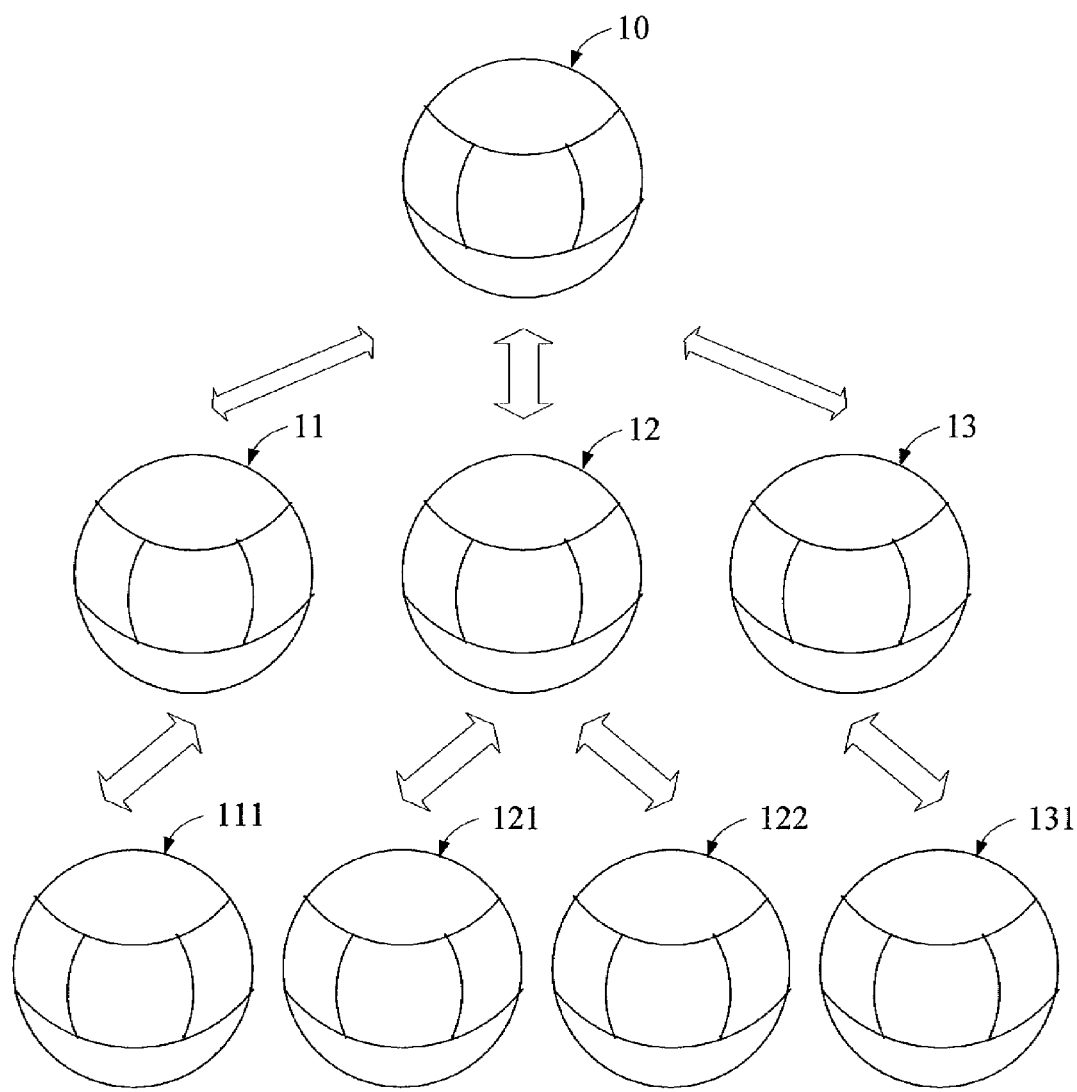
FIG. 1 illustrates a hierarchy of displaying the multimedia data in a first embodiment of this invention.

A first embodiment of the present invention is a system for representing a multimedia display. The multimedia display at least displays multimedia data and a menu. The multimedia data displayed on the multimedia display can be viewed as a hierarchy of two dimensional planes as drawn in FIG. 1. In FIG. 1, each of the two dimensional planes is represented as a sphere.

The multimedia data displayed on the multimedia display begins from a most general data, i.e., from a root sphere 10. The root sphere 10 comprises three sub-spheres 11, 12, and 13, the sub-sphere 11 comprises one sub-sphere 111, the sub-sphere 12 comprises two sub-spheres 121 and 122, and the sub-sphere 13 comprises one sub-sphere 131. More particularly, a user can use the two dimensional planes of the root sphere 10 to select which multimedia data to be displayed at a first layer. If the selected multimedia data corresponds to the sub-sphere 12, the sub-sphere 12 is then displayed for the user to select further multimedia data to be displayed, i.e., select either sub-sphere 121 or 122 at a second layer. If the selected multimedia data at the second layer corresponds to the sub-sphere 121, the sub-sphere 121 is then displayed. These spheres form a hierarchy of displaying the multimedia data.

Figure 2A:
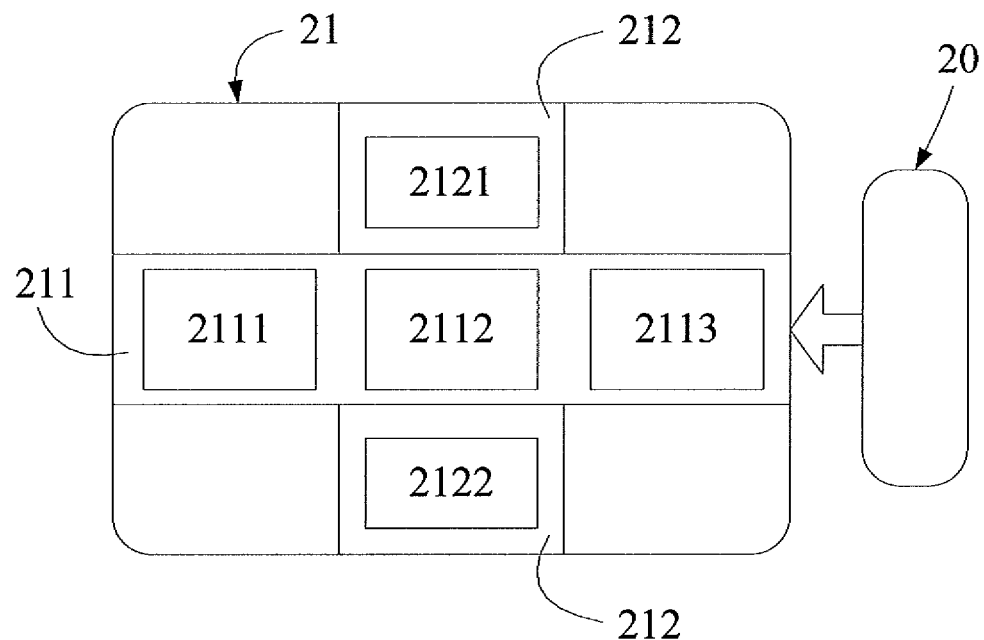
FIG. 2A illustrates a system of the first embodiment.

FIG. 2A illustrates the first embodiment which comprises an interface 20 and an apparatus 21. The interface 20 is configured for inputting a first signal, a second signal, and a third signal. The apparatus 21 comprises a first screen 211 and a second screen 212 respectively corresponding to one of the two dimensional planes of each sphere shown in FIG. 1. The first screen 211 is controlled by one of the first signal and the second signal and is configured to display the multimedia data, such as multimedia data 2111, 2112, and 2113. The second screen 212 is controlled by the third signal and is configured to display the menu which comprises a list of operations, such as operations 2121 and 2122.

Figure 2B:
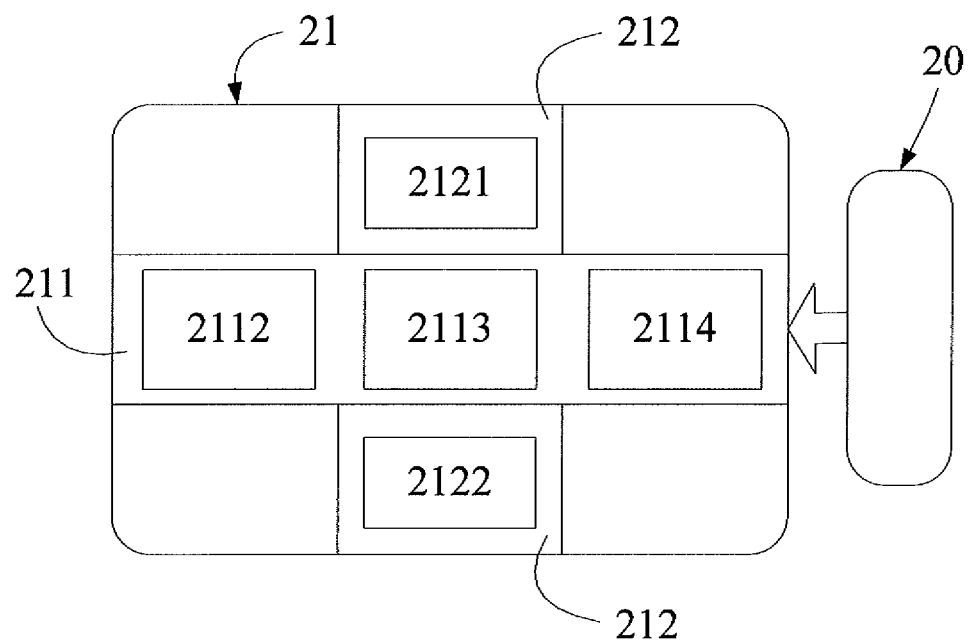
FIG. 2B illustrates a shifted multimedia display of FIG. 2A.

The first signal, the second signal, and the third signal inputted from the interface 20 trigger a first function, a second function, and a third function, respectively. Both the first function and the second function are directional functions. To be more specific, the first function is a shift of the multimedia data 2111, 2112, 2113 toward the left-hand side, and the second function is a shift of the multimedia data 2111, 2112, and 2113 toward the right-hand side. For example, if the first signal is inputted, the multimedia data 2112 and 2113 are shifted one slot to the left, the multimedia data 2111 disappears from the first screen 211, a new multimedia data 2114 appears in the first screen 211 as shown in FIG. 2B. The third function is also a directional function moving the menu upward. Alternatively, the third function can trigger one of the operations 2121 and 2122 and the selected multimedia data is operated according to the triggered operation.

FIG. 3 shows some practical examples in accordance with the first embodiment. In FIG. 3A, when the system is powered on, the first screen 211 first displays retrieval sources of the multimedia data, including a USB flash disk 301, a memory stick card 302, and a compact flash card 303. The second screen 212 displays a setup menu 304. If the memory stick card 302 is selected, the multimedia data stored in the memory stick card 302 and a generated menu are displayed on the first screen 211 and the second screen 212. FIG. 3B illustrates the result of selecting the memory stick card 302. In FIG. 3B, the first screen 211 displays types of the multimedia data stored in the memory stick card 302, including a Movie 311, a Music 312, and a Picture 313. It means that the memory stick card 302 comprises multimedia data which are related to movie, music, and picture. The second screen 212 displays a plurality of operations, including a Previous 314 and a Setup Menu 315, wherein the Previous 314 is an operation making the multimedia display go back to the previous layer, i.e., the multimedia display shown in FIG. 3A. If the Music 312 is selected, the multimedia data and menu related to music are displayed on the first screen 211 and the second screen 212 in response to the selection. FIG. 3C shows the result of selecting the Music 312. In FIG. 3C, the first screen 211 displays catalogues of the multimedia data, including an Album 321, an All Songs 322, and a Playlist 323. The second screen 212 displays a list of a plurality of operations, including an Edit 324, a Previous 325, a Play 326, and a Select 327. One may observe that the number of the operations in this layer is more than that in the previous layers. The present invention does not limit the number of operations shown on the first screen 211 and the second screen 212.

Figure 3A:
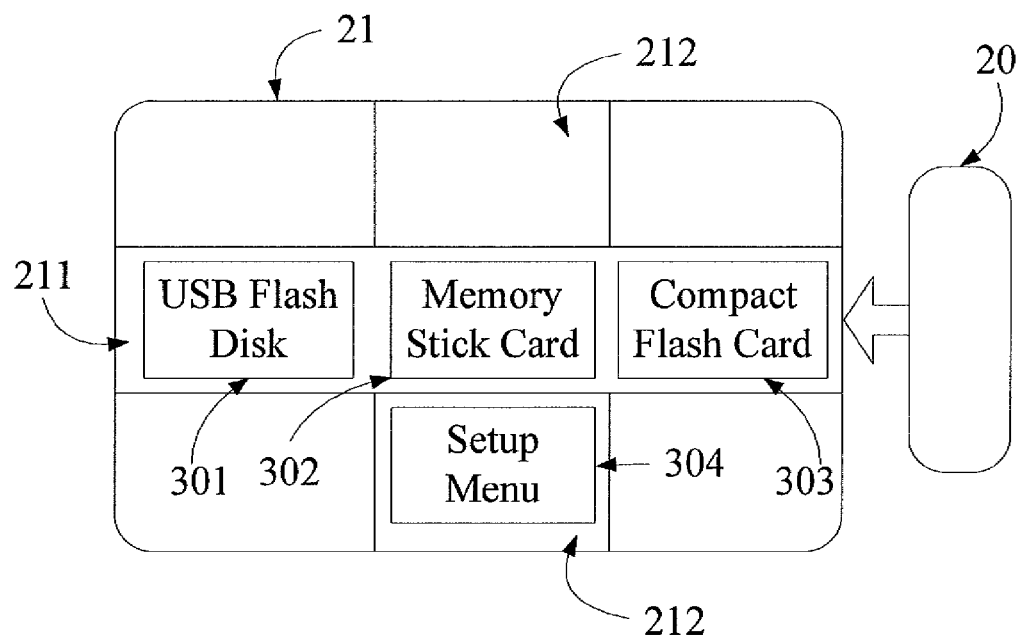
FIG. 3A illustrates a first layer of a practical example of the first embodiment.
Figure 3B:
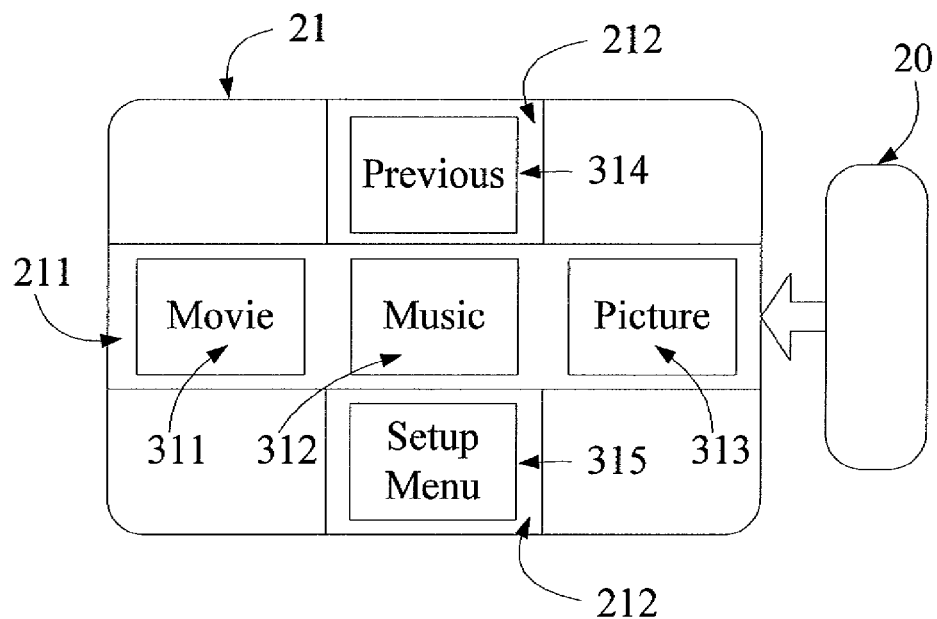
FIG. 3B illustrates a second layer of the practical example of the first embodiment.
Figure 3C:
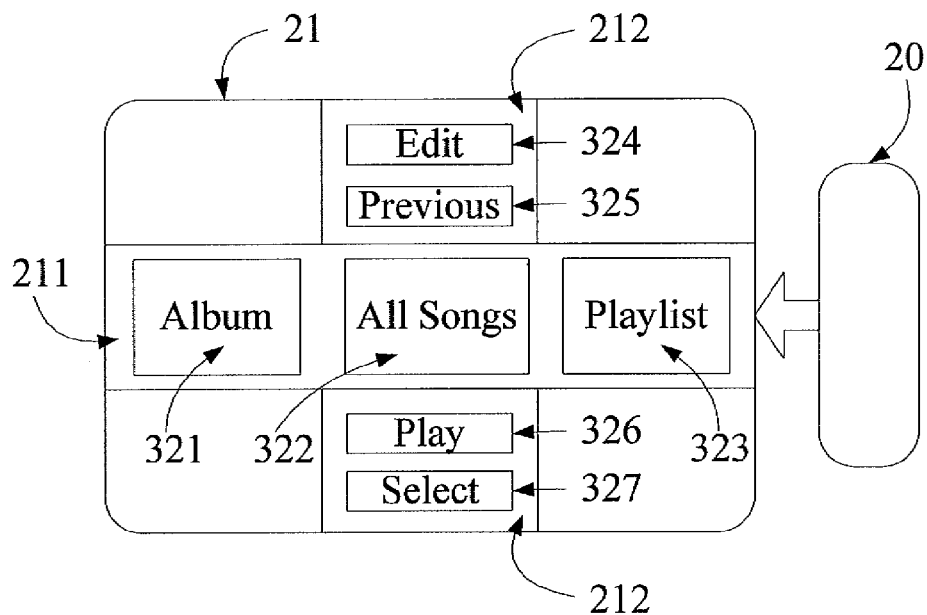
FIG. 3C illustrates a third layer of the practical example of the first embodiment.
Figure 3D:
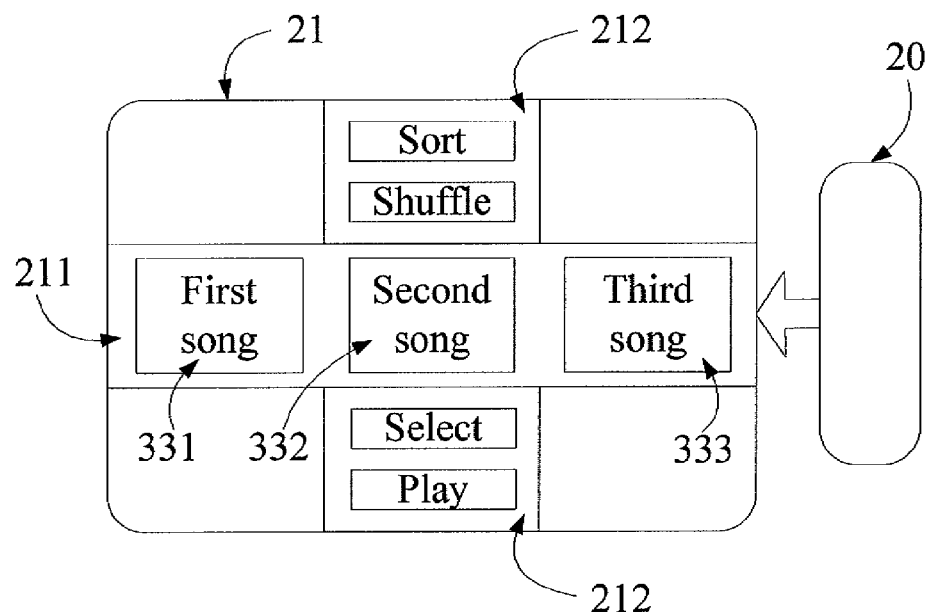
FIG. 3D illustrates a fourth layer of the practical example of the first embodiment.

If the All Songs 322 is selected, it is shifted to the center of the first screen 211 by inputting the first signal or the second signal and then selected by inputting the third signal to execute the Select 327. Right after the All Songs 322 is selected, the first screen 211 comprises multimedia data, including a first song 331, a second song 332, and a third song 333, and the second screen 212 comprises other operations that can operate the multimedia data by inputting the third signal as FIG. 3D shows.

When the second screen 212 is currently under control and a user inputs the first signal, the first signal triggers a function other than the first function. Similarly, when the second screen 212 is currently under control and a user inputs the second signal, the second signal triggers a function other than the second function. For example, when the second screen 212 is currently under control and the user inputs the first signal or the second signal, the first signal or the second signal triggers an exit of the third function so that the second screen 212 is disabled and the first screen 211 is now enabled to be controlled.

In this embodiment, the user can order the list of the second screen 212 according to his or her preference. More particularly, the user is able to reorder the operations in the list manually by inputting instructions through the interface 20 of the Setup Menu 304. The reordering of the list can be done automatically as well. For example, an operation being selected more often should be placed closer to the center of the multimedia display, wherein the selection frequency may be determined by a selection rate of one operation counted by a trigger counter. A larger selection rate is treated as that the user wants to use the corresponding operation more. When the trigger counter exceeds a predetermined threshold, the list of the operations is reordered based on the current numbers of the counters.

In this embodiment, the multimedia data may be an audio, an image, a texture, a video file, or the like, or even a combination of these files. The type of the multimedia data is not a limitation of the present invention.

Figure 4:
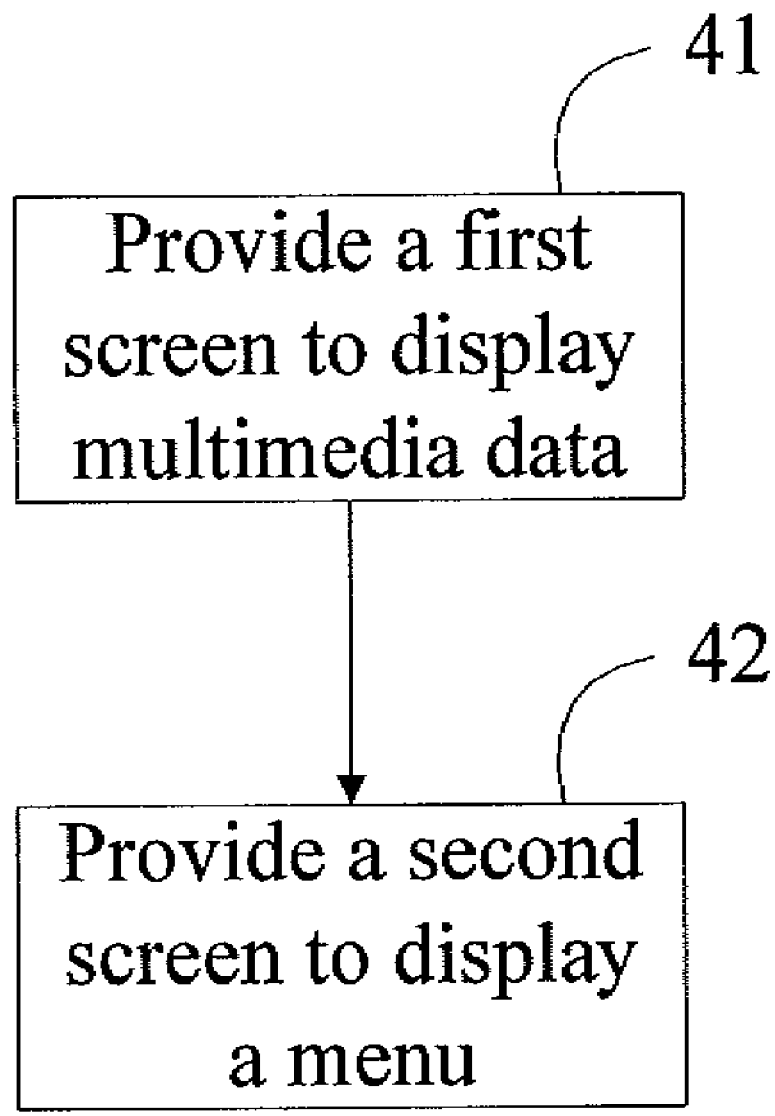
FIG. 4 illustrates a second embodiment of this invention.

FIG. 4 illustrates a second embodiment of this invention, which is a method for representing a multimedia display. The second embodiment corresponds to the first embodiment. In particular, the second embodiment may be applied to the system recited in the first embodiment. First, in step 41, a first screen is provided to display the multimedia data, wherein the first screen is controlled by one of a first signal and a second signal. In addition, the first signal triggers a first function and the second signal triggers a second function. Next, in step 42, a second screen is provided to display a menu is provided, wherein the second screen is controlled by a third signal and the third signal triggers a third function.

In addition to the steps shown in FIG. 4, the second embodiment is capable of executing all operations or functions recited in the first embodiment.

Figure 5:
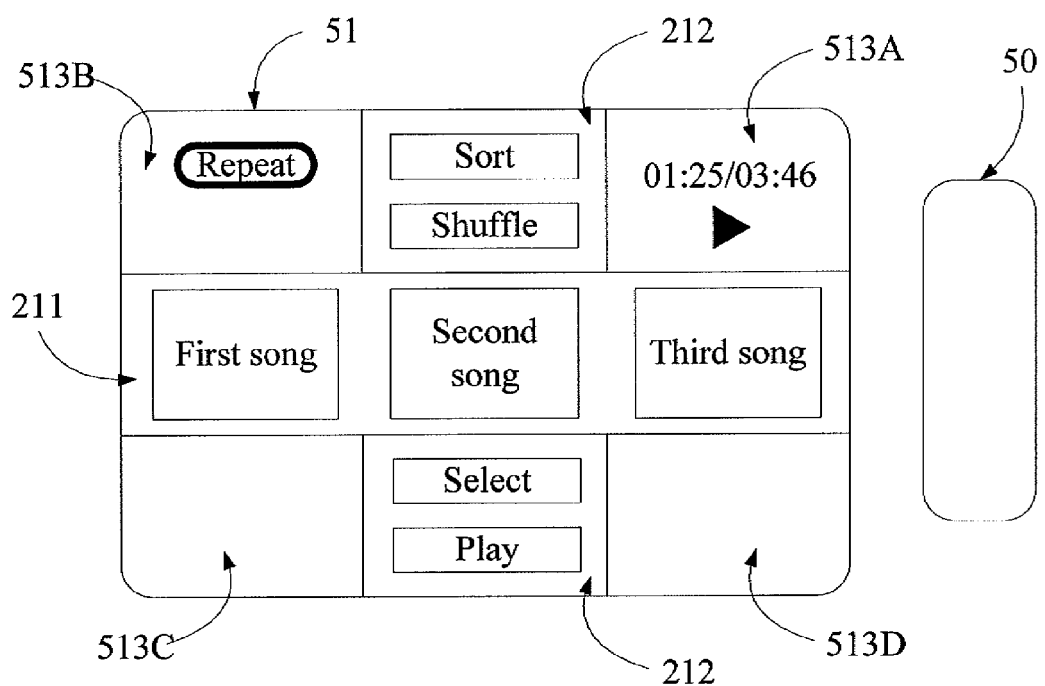
FIG. 5 illustrates a third embodiment of this invention.

A third embodiment of this invention is illustrated in FIG. 5, which is a system for representing a multimedia display. The system comprises an interface 50 and a screen 51. The interface 50 is similar to the interface 20 of the first embodiment. In contrast with the screen 21 of the first embodiment, the screen 51 further comprises a third screen 513. The third screen 513, comprising sub-screens 513A, 513B, 513C and 513D, is configured to display information related to the currently played or selected multimedia data and to display another list of operations to control the currently played or selected multimedia data. For example, if a second song shown in FIG. 5 is currently played, the sub-screen 513A displays the information of time for playing the whole second song and time having played, and the sub-screen 513B displays a list of executing a "Repeat" operation on the second song. The "Repeat" operation may be controlled in response to a fourth signal which is inputted through the interface 50.

In addition to the descriptions above, the third embodiment comprises all of the elements recited in the first embodiment. That is, the third embodiment is able to execute all operations or function recited in the first embodiment.

Figure 6:
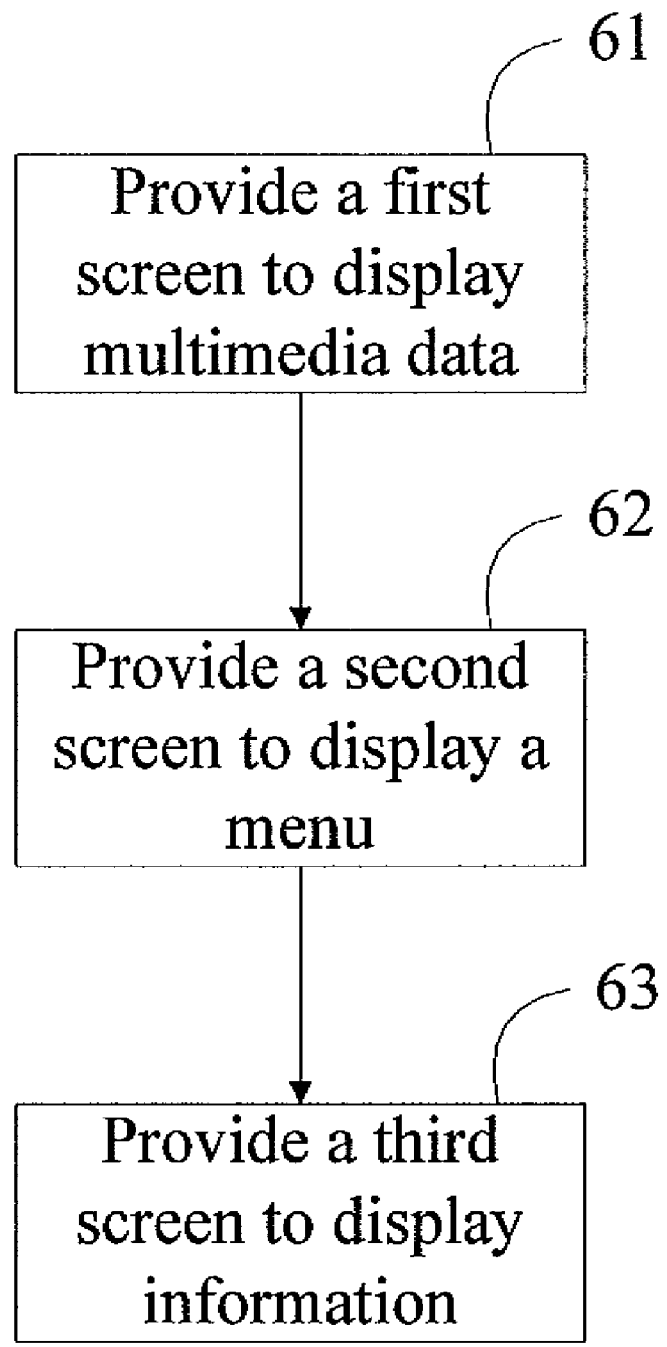
FIG. 6 illustrates a fourth embodiment of this invention.

A fourth embodiment of this invention is illustrated in FIG. 6, which is a method for representing a multimedia display. The fourth embodiment corresponds to the third embodiment. In particular, the fourth embodiment may be applied to the system recited in the third embodiment. In step 61, a first screen is provided to display multimedia data, wherein the first screen is controlled by one of a first signal and a second signal. In addition, the first signal triggers a first function and the second signal triggers a second function. Next, in step 62, a second screen is provided to display a menu, wherein the second screen is controlled by a third signal which triggers a third function. Then step 63 is executed in which a third screen is provided to display information related to the currently played multimedia data and to display another list of operations to control the currently played multimedia data.

In addition to the steps shown in FIG. 6, the fourth embodiment is capable of executing all operations or functions recited in the third embodiment.

As a result, the present invention has advantages of friendly displaying information of multimedia data and easily controlling the multimedia data.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A physical display apparatus for use in an electronic device, the display apparatus being used for representing a multimedia display, the multimedia display hierarchically displaying a plurality of selectable multimedia data icons and a menu, the physical display apparatus comprising:

a first screen adapted to display a first layer first screen content comprising at least a portion of a first display layer set of selectable multimedia data icons corresponding to a plurality of first sources of multimedia data, and adapted to be controlled by one of a first signal and a second signal such that an input of the first signal triggers a first function causing the first layer first screen content to change and an input of the second signal triggers a second function causing the first layer first screen content to change; and a second screen adapted to display a first layer second screen content comprising a first layer menu corresponding to a plurality of operations that corresponds to the first display layer set of selectable multimedia data icons, and adapted to be controlled by a third signal such that an input of the third signal triggers a third function causing the first layer second screen content to change;

wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponding to the second display layer set of selectable multimedia data icons at the same time, wherein the first sources and the second sources are of different scopes.

2. The physical display apparatus of claim 1, wherein each of the selectable multimedia data icons corresponds to at least one of an audio, an image, a texture, a video file, and a combination thereof.

3. The physical display apparatus of claim 1, wherein the first function and the second function are directional functions.

4. The physical display apparatus of claim 1, wherein the third function is a directional function.

5. The physical display apparatus of claim 1, wherein the first layer menu comprises a list of a plurality of operations and the third function triggers one of the plurality of operations.

6. The physical display apparatus of claim 5, wherein the list is ordered according to user preference.

7. The physical display apparatus of claim 6, wherein the user preference is received manually.

8. The physical display apparatus of claim 6, wherein the user preference is determined by a trigger counter.

9. The physical display apparatus of claim 8, wherein the trigger counter corresponds to a selection rate of one of the operations.

10. The physical display apparatus of claim 8, wherein the list is reordered when the trigger counter exceeds a predetermined threshold.

11. The physical display apparatus of claim 1, wherein the first layer menu comprises a list of a plurality of operations, and one of the first display layer set of selectable multimedia data icons is operated according to one of the plurality of operations selected via the third function.

12. The physical display apparatus of claim 11, wherein the first signal triggers a function other than the first function when the second screen is currently controlled.

13. The physical display apparatus of claim 12, wherein the second signal triggers a function other than the second function when the second screen is currently controlled.

14. The physical display apparatus of claim 1, wherein the first signal triggers an exit of the third function when the second screen is currently controlled.

15. The physical display apparatus of claim 14, wherein the second signal triggers the exit of the third function when the second screen is currently controlled.

16. A physical display apparatus for use in an electronic device, the physical display apparatus being used for representing a multimedia display, the multimedia display hierarchically displaying a plurality of selectable multimedia data icons, a menu, and information related to at least one of the selectable multimedia data icons, the physical display apparatus comprising:

a first screen adapted to display a first layer first screen content comprising at least a portion of a first display layer set of selectable multimedia data icons corresponding to a plurality of first sources of multimedia data, and adapted to be controlled by one of a first signal and a second signal such that an input of the first signal triggers a first function causing the first layer first screen content to change and an input of the second signal triggers a second function causing the first layer first screen content to change;

a second screen adapted to display a first layer second screen content comprising a first layer menu corresponding to a plurality of operations that corresponds to the first display layer set of selectable multimedia data icons, and adapted to be controlled by a third signal such that an input of the third signal triggers a third function causing the first layer second screen content to change; and a third screen for displaying the information;

wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

17. The physical display apparatus of claim 16, wherein each of the selectable multimedia data icons corresponds to at least one of an audio, an image, a texture, a video file, and a combination thereof.

18. The physical display apparatus of claim 16, wherein the first function and the second function are directional functions.

19. The physical display apparatus of claim 16, wherein the third function is a directional function.

20. The physical display apparatus of claim 16, wherein the first layer menu comprises a list of a plurality of operations and the third function triggers one of the plurality of operations.

21. The physical display apparatus of claim 20, wherein the list is ordered according to user preference.

22. The physical display apparatus of claim 21, wherein the user preference is received manually.

23. The physical display apparatus of claim 21, wherein the user preference is determined by a trigger counter.

24. The physical display apparatus of claim 23, wherein the trigger counter corresponds to a selection rate of one of the operations.

25. The physical display apparatus of claim 23, wherein the list is reordered when the trigger counter exceeds a predetermined threshold.

26. The physical display apparatus of claim 16, wherein the first layer menu comprises a list of a plurality of operations, and one of the first display layer set of selectable multimedia data icons is operated according to one of the plurality of operations selected via the third function.

27. The physical display apparatus of claim 26, wherein the first signal triggers a function other than the first function, when the second screen is currently controlled.

28. The physical display apparatus of claim 27, wherein the second signal triggers a function other than the second function when the second screen is currently controlled.

29. The physical display apparatus of claim 16, wherein the first signal triggers an exit of the third function when the second screen is currently controlled.

30. The physical display apparatus of claim 29, wherein the second signal triggers the exit of the third function when the second screen is currently controlled.

31. The physical display apparatus of claim 16, wherein the third screen is controlled by a fourth signal.

32. A method for representing a multimedia display, the multimedia display hierarchically displaying a plurality of selectable multimedia data icons and a menu, the method comprising:

providing a first screen, the first screen adapted to display a first layer first screen content comprising at least a portion of a first display layer set of selectable multimedia data icons corresponding to a plurality of first sources of multimedia data, and adapted to be controlled by one of a first signal and a second signal such that an input of the first signal triggers a first function causing the first layer first screen content to change, and an input of the second signal triggers a second function causing the first layer first screen content to change; and providing a second screen, the second screen adapted to display a first layer second screen content comprising a first layer menu corresponding to a plurality of operations that corresponds to the first display layer set of selectable multimedia data icons, and adapted to be controlled by a third signal such that an input of the third signal triggers a third function causing the first layer second screen content to change;

wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

33. The method of claim 32, wherein each of the selectable multimedia data icons corresponds to at least one of an audio, an image, a texture, a video file, and a combination thereof.

34. The method of claim 32, wherein the first function and the second function are directional functions.

35. The method of claim 32, wherein the third function is a directional function.

36. The method of claim 32, the first layer menu comprising a list of a plurality of operations, wherein the third function triggers one of the plurality of operations by the third function.

37. The method of claim 36, wherein the list is ordered according to user preference.

38. The method of claim 37, wherein the user preference is received manually.

39. The method of claim 37, wherein the user preference is determined by a trigger counter.

40. The method of claim 39, wherein the trigger counter corresponds to a selection rate of one of the operations.

41. The method of claim 39, further comprising the step of reordering the list when the trigger counter exceeds a predetermined threshold.

42. The method of claim 32, wherein the first layer menu comprises a list of a plurality of operations, and one of the first display layer set of selectable multimedia data icons is operated according to one of the plurality of operations selected via the third function.

43. The method of claim 42, wherein the first signal triggers a function other than the first function when the second screen is currently controlled.

44. The method of claim 43, wherein the second signal triggers a function other than the second function when the second screen is currently controlled.

45. The method of claim 32, wherein the first signal triggers an exit of the third function when the second screen is currently controlled.

46. The method of claim 45, wherein the second signal triggers the exit of the third function when the second screen is currently controlled.

47. A method for representing a multimedia display, the multimedia display hierarchically displaying a plurality of selectable multimedia data icons, a menu, and information related to at least one of the selectable multimedia data icons, the method comprising:

providing a first screen, the first screen adapted to display a first layer first screen content comprising at least a portion of a first display layer set of selectable multimedia data icons corresponding to a plurality of first sources of multimedia data, and adapted to be controlled by one of a first signal and a second signal such that an input of the first signal triggers a first function causing the first layer first screen content to change, and an input of the second signal triggers a second function causing the first layer first screen content to change;

providing a second screen, the second screen adapted to display a first layer second screen content comprising a first layer menu corresponding to a plurality of operations that corresponds to the first display layer set of selectable multimedia data icons, and adapted to be controlled by a third signal such that an input of the third signal triggers a third function causing the first layer second screen content to change; and providing a third screen for displaying the information;

wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

48. The method of claim 47, wherein each of the selectable multimedia data icons corresponds to at least one of an audio, an image, a texture, a video file, and a combination thereof.

49. The method of claim 47, wherein the first function and the second function are directional functions.

50. The method of claim 47 wherein the third function is a directional function.

51. The method of claim 47, the first layer menu comprising a list of a plurality of operations, wherein the third function triggers one of the plurality of operations by the third function.

52. The method of claim 51, wherein the list is ordered according to user preference.

53. The method of claim 52, wherein the user preference is received manually.

54. The method of claim 52, wherein the user preference is determined by a trigger counter.

55. The method of claim 54, wherein the trigger counter corresponds to a selection rate of one of the operations.

56. The method of claim 54, further comprising the step of reordering the list when the trigger counter exceeds a predetermined threshold.

57. The method of claim 47, wherein the first layer menu comprises a list of a plurality of operations, and one of the first display layer set of selectable multimedia data icons is operated according to one of the plurality of operations selected via the third function.

58. The method of claim 57, wherein the first signal triggers a function other than the first function, when the second screen is currently controlled.

59. The method of claim 58, where in the second signal triggers a function other than the second function when the second screen is currently controlled.

60. The method of claim 47, wherein the first signal triggers an exit of the third function when the second screen is currently controlled.

61. The method of claim 60, wherein the second signal triggers the exit of the third function when the second screen is currently controlled.

62. The method of claim 47, wherein the third screen is controlled by a fourth signal.

63. A system for representing a multimedia display, the system being an electronic device, the multimedia display hierarchically displaying a plurality of selectable multimedia data icons and a menu, the system comprising:
   an interface for inputting a first signal, a second signal, and a third signal; and
   a physical display apparatus, comprising:
      a first screen, adapted to display a first layer first screen content comprising at least a portion of a first display layer set of selectable multimedia data icons corresponding to a plurality of first sources of multimedia data, and adapted to be controlled by one of the first signal and the second signal such that an input of the first signal triggers a first function causing the first layer first screen content to change and an input of the second signal triggers a second function causing the first layer first screen content to change; and
      a second screen, adapted to display a first layer second screen content comprising a first layer menu corresponding to a plurality of operations that corresponds to the first display layer set of selectable multimedia data icons, and adapted to be controlled by the third signal such that an input of the third signal triggers a third function causing the first layer second screen content to change;
      wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

64. A system for representing a multimedia display, the system being an electronic device, the multimedia display hierarchically displaying a plurality of selectable multimedia data icons, a menu, and information related to at least one of the selectable multimedia data icons, the system comprising:
   an interface for inputting a first signal, a second signal, and a third signal; and
   a physical display apparatus, comprising:
      a first screen adapted to display a first layer first screen content comprising at least a portion of a first display layer set of selectable multimedia data icons corresponding to a plurality of first sources of multimedia data, and adapted to be controlled by one of the first signal and the second signal such that an input of the first signal triggers a first function causing the first layer first screen content to change and an input of the second signal triggers a second function causing the first layer first screen content to change;
      a second screen adapted to display a first layer second screen content comprising a first layer menu corresponding to a plurality of operations that corresponds to the first display layer set of selectable multimedia data icons, and adapted to be controlled by the third signal such that an input of the third signal triggers a third function causing the first layer second screen content to change; and
      a third screen for displaying the information;
      wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

65. A physical display apparatus for use in an electronic device, the display apparatus being used for representing a multimedia display, the multimedia display hierarchically displaying a plurality of selectable multimedia data icons and a menu, the physical display apparatus comprising:
   means adapted to display a first layer first screen content comprising at least a portion of a first display layer set of selectable multimedia data icons corresponding to a plurality of first sources of multimedia data, and adapted to be controlled by one of a first signal and a second signal such that an input of the first signal triggers a first function causing the first layer first screen content to change and an input of the second signal triggers a second function causing the first layer first screen content to change; and
   means adapted to display a first layer second screen content comprising a first layer menu corresponding to a plurality of operations that corresponds to the first display layer set of selectable multimedia data icons, and adapted to be controlled by a third signal such that an input of the third signal a third function causing the first layer second screen content to change;
   wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

66. A physical display apparatus for use in an electronic device, the display apparatus being used for representing a multimedia display, the multimedia display hierarchically displaying a plurality of selectable multimedia data icons, a menu, and information related to at least one of the selectable multimedia data icons, the display apparatus comprising:
   means adapted to display a first layer first screen content comprising at least a portion of a first display layer set of selectable multimedia data icons corresponding to a plurality of first sources of multimedia data, and adapted to be controlled by one of a first signal and a second signal such that an input of the first signal triggers a first function causing the first layer first screen content to change and an input of the second signal triggers a second function causing the first layer first screen content to change;

means adapted to display a first layer second screen content comprising a first layer menu corresponding to a plurality of operations that corresponds to the first display layer set of selectable multimedia data icons, and adapted to be controlled by a third signal such that an input of the third signal triggers a third function causing the first layer second screen content to change; and means for displaying the information;

wherein selecting one of the selectable multimedia data icons of the first display layer set causes the first screen to display a second layer first screen content comprising at least a portion of a second display layer set of selectable multimedia data icons corresponding to a plurality of second sources of the multimedia data and the second screen to display a second layer second screen content comprising a second layer menu corresponding to a plurality of operations that corresponds to the second display layer set of selectable multimedia data icons at the same time, wherein the first sources and the second sources are of different scopes.

* * * * *